Jan. 16, 1951 T. F. HANNIGAN 2,538,154
PASTRY SERVING DEVICE
Filed Sept. 18, 1947
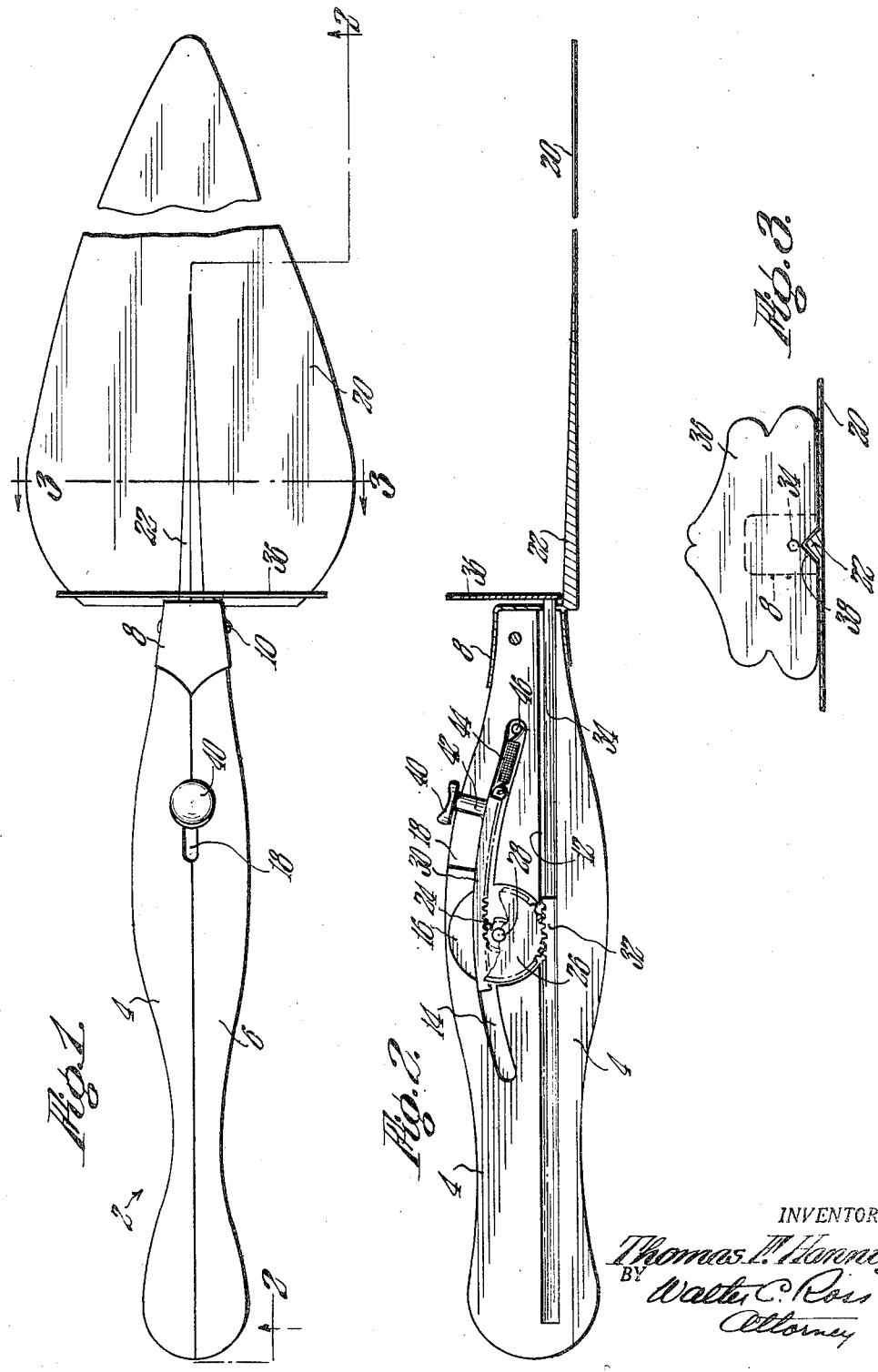
INVENTOR.
Thomas F. Hannigan
BY Walter C. Ross
Attorney Patented Jan. 16, 1951

2,538,154

UNITED STATES PATENT OFFICE 2,538,154

PASTRY SERVING DEVICE

Thomas F. Hannigan, Springfield, Mass.

Application September 18, 1947, Serial No. 774,750

1 Claim. (Cl. 294—7)

This invention relates to improvements in devices for serving pastry such as cake, pie and the like.

The principal objects of the invention are directed to the provision of a device which is adapted for cutting cake, pie and the like and is arranged for serving portions thereof.

The device is characterized by a blade which may be used for cutting or dividing a cake or the like and for supporting a portion thereof to facilitate serving the same and ejecting means is manually operable for ejecting said portion from the blade.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Fig. 1 is a plan view of a serving device embodying the novel features of the invention;

Fig. 2 is a combined longitudinal sectional and elevational view on the line 2—2 of Fig. 1; and Fig. 3 is a transverse sectional elevational view on the line 3—3 of Fig. 1.

Referring now to the drawings more in detail, the invention will be fully described.

A handle 2 is provided which is formed from complemental members 4 and 6. These members may be formed from plastic or any other suitable material and are secured together in back to back relation in any suitable manner.

A ferrule 8 encloses forward ends of the handle members 4 and 6 and is secured thereto by a rivet 10 or the like.

At least one of the handle members such as 4 on its inner face is provided with a lower longitudinal guideway 12 and an upper longitudinally curving guideway 14.

A circular recess 16 is also provided on the inner face of said handle member 4 and a longitudinally extending slot 18 leads into the curved guideway 14. The guideways and recess may be partly formed in the contiguous faces of members 4 and 6.

A blade 20 is fixed to the ferrule 8 and extends forwardly therefrom. Said blade is relatively thin and preferably has forwardly converging side edges as shown.

A ridge 22 on said plate 20 extends forwardly from the ferrule 8 and is forwardly tapering and triangular in cross section as shown.

A pinion 24 and gear 26 are integral and are rotatable on a stud 28 disposed within the recess 16. The pinion is in mesh with a rack 30 which is reciprocable in the guideway 14 and the gear 26 is in mesh with a rack 32 reciprocable in the guideway 12.

A rod 34 fixed to the rack 32 extends forwardly therefrom and is reciprocable in the ferrule 8 and has fixed to its forward end an ejector 36 disposed in a plane at right angles relative to the blade.

The lower edge of the ejector is provided with a cut-out or recess 38 complemental to the ridge 22.

A manually engageable member 40, button-like in form, has a shank 42 extending through slot 18 which is fixed to rack 30.

A spring 44 has opposite ends connected to an end of rack 30 and a pin 46 fixed in an end of guideway 14.

With the handle of the device gripped by the hand an edge of the blade may be employed to part or cut through a loaf of cake or the like to provide separate portions and the blade may be passed beneath a portion for serving the same.

As the handle is gripped and with a portion of cake or the like on the blade the manually engageable member is moved rearwardly of the handle so that rack 30 rotates the pinion and gear counterclockwise. In this movement of the gear and pinion, the gear 26 moves the rack 32 and rod 34 forwardly so as to move the ejector forwardly of the blade. As the ejector moves forwardly the object on the blade is ejected therefrom.

When the member 40 is released the spring 44 acts on rack to return it to the position shown whereby the gear and pinion are rotated clockwise so as to move rack 32 and rod 34 rearwardly and bring the ejector to the position shown.

The ridge 22 serves to impinge the lower side of the object on the blade and prevents accidental sideways displacement thereof.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

A serving device comprising in combination, an elongated handle having a ferrule on the forward end thereof provided with an opening, a flat and relatively thin blade connected to and extending forwardly from the ferrule and having converging opposite side edges, said handle provided with spaced lower and upper longitudinal guideways and a circular recess intermediate the ends of the guideways disposed between and in communication therewith, the forward end of the lower guideway being in communication with the opening in the ferrule, an integral pinion and gear rotatable in the recess of said handle, a lower rack reciprocable in the lower guideway in operative engagement with said gear having a forward end extending through the opening in the ferrule, an ejector secured to the forward end of said lower rack disposed over said blade for traversing the same accordingly as said lower rack reciprocates, an upper rack reciprocable in the upper guideway in operative engagement with said pinion, said handle provided with an elongated slot in communication with the upper guideway, an operating member secured to said upper rack and extending through the slot adapted for manual engagement for reciprocation of said upper rack, and spring means in the upper guideway disposed between an end thereof and an adjacent end of said upper rack for urging said upper rack in one direction.

THOMAS F. HANNIGAN.

REFERENCES CITED

The following references are of record in the file of this patent:

UNITED STATES PATENTS

| Number | Name | Date |
|---|---|---|
| 2,015,358 | Brokvist | Sept. 24, 1935 |

FOREIGN PATENTS

| Number | Country | Date |
|---|---|---|
| 484,482 | Germany | Oct. 18, 1929 |